Jan. 20, 1942.   F. J. NERNEY   2,270,330
EYEGLASS CONSTRUCTION
Filed Nov. 25, 1940
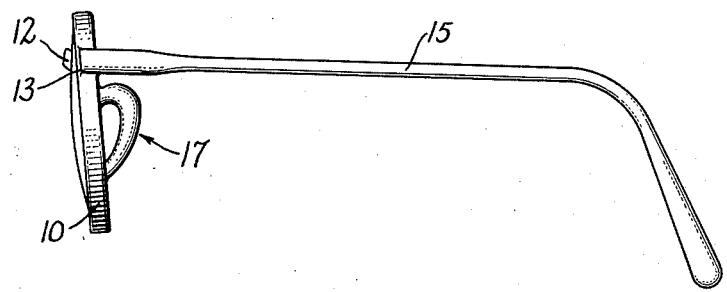
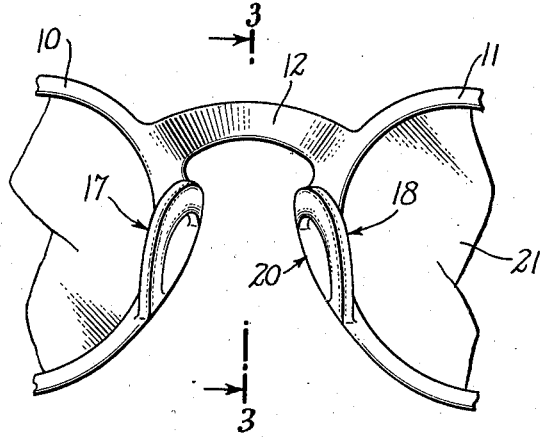
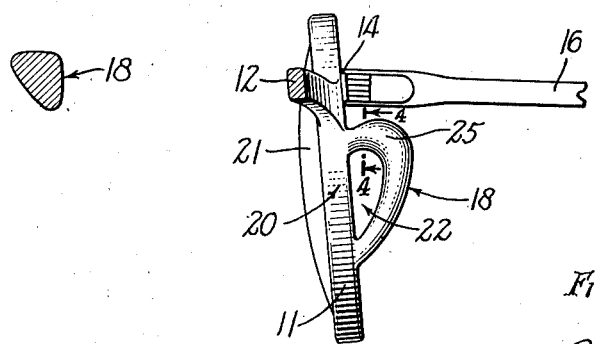
INVENTOR
Frank J. Nerney
BY
Blair, Curtis & Hayward
ATTORNEYS Patented Jan. 20, 1942

2,270,330

UNITED STATES PATENT OFFICE 2,270,330

EYEGLASS CONSTRUCTION

Frank J. Nerney, Attleboro, Mass., assignor to Bay State Optical Company, Attleboro, Mass., a corporation of Maine Application November 25, 1940, Serial No. 366,966

1 Claim. (Cl. 88—48)

This invention relates to eyeglass construction and more particularly to the nose pads of a non-metallic frame.

One of the objects of this invention is to provide an eyeglass construction which will be neat and attractive in appearance. Another object is to provide a construction of the above character whose primary characteristics will be simplicity, practicability, and durability. Another object is to provide a construction of the above character in which the material is so disposed as to obtain a high degree of strength without heavy construction. Another object is to provide a construction of the above character which is well able to withstand hard usage. Another object is to provide a construction of the above character whose pressure against the nose of the wearer will be so positioned as to most readily suit the supporting requirements of an eyeglass frame. A further object is to provide a construction of the above character wherein irritability and discomfort to the wearer are successfully eliminated. Still another object is to provide a construction of the above character which may be easily and quickly adjusted by the retailer. A still further object is to provide a construction of the above character which will firmly hold its position on the nose of the wearer without causing undue discomfort. Other objects will be in part obvious and in part pointed out hereinafter.

The invention accordingly consists in the features of construction, combinations of elements and arrangements of parts, all as will be exemplified in the structure to be hereinafter described, and the scope of the application of which will be indicated in the following claim.

In the accompanying drawing in which is shown one of the various possible embodiments of this invention, Figure 1 is a side elevation of an eyeglass frame;

Figure 2 is a fragmentary rear elevation, on an enlarged scale, of the frame shown in Figure 1;

Figure 3 is a vertical section taken along the line 3—3 of Figure 2; and,

Figure 4 is a vertical section, on an enlarged scale, taken along the line 4—4 of Figure 3.

Similar reference characters refer to similar parts throughout the several views of the drawing.

As conducive to a clearer understanding of certain features of this invention, it might here be pointed out that non-metallic eyeglass frames are known for their "wearing" comfort. To enhance this feature, the nose pads of non-metallic frames are made of substantial size and bear against a substantial portion of the nose of a wearer. As this prevents "breathing" by this portion of the skin, perspiration takes place with resultant discomfort to the wearer. Thus, although comfort results to the wearer of frames of this type by having the weight of the frame spread over a large area, this is counteracted to a great extend by the discomfort caused by the cutting off of "breathing" to that portion of the nose contacted by the nose pads. A further difficulty is experienced in adjusting the nose pads of non-metallic frames because of the fact that such frames cannot be adjusted materially without throwing the lenses off center with respect to the eyes. Thus, a majority of the adjustment must be made in the nose pad, which is difficult to adjust because of the extent of its connection to the frame. It is another object of this invention to provide a construction wherein the above-mentioned difficulties, as well as many others, are successfully overcome.

It might here be noted that reference hereinafter to an "outward" direction signifies a direction to the left or right of the bridge of an eyeglass frame in the direction of the temples, while the term "inward" denotes a direction opposite thereto. A "rearward" direction refers to a direction toward the face of the wearer, whereas the term "forward" denotes the opposite direction. An "upward" direction refers to a direction upwardly from the face of the wearer, while a "downward" direction is opposite thereto.

Referring now to Figures 1 and 2, there is shown an eyeglass frame preferably formed from zylonite or the like and having rims 10 and 11 connected by a bridge portion 12. Rims 10 and 11 have endpiece portions 13 and 14 (Figures 1 and 3) formed thereon to which are hingedly connected a pair of temples 15 and 16 respectively. Beneath bridge 12 and extending rearwardly from the rear surface of the frame are a pair of nose guards, generally indicated at 17 and 18. As these nose guards are substantially similar in shape and construction, only nose guard 18 (Figures 2 and 3) will be described in detail.

As best shown in Figure 2, the inner portion of rim 11, generally indicated at 20, curves gradually upwardly and inwardly from the normal periphery of the rim so that this portion of the rim conforms to the shape of the nose of the wearer. Nose guard 18 is secured to this portion of the rim, extends rearwardly therefrom (Figure 3), and preferably curves outwardly toward lens 21 (Figure 2). Thus, the rear edges of the nose guards are spaced more widely than the forward edges thereof, causing them to fit the sloping sides of the nose of the wearer. Nose guard 18 is preferably of tear-drop shape (Figure 3), having its largest portion positioned in the upper end thereof. The rear edge of the nose guard slopes downwardly and forwardly (Figure 3) from the upper end to the rear surface of rim 11.

Referring now to Figure 3, nose guard 18 has an opening, generally indicated at 22, extending through its center section, its front edge terminating at the rear surface of enlarged rim portion 20. This opening is also preferably of tear-drop shape, having its largest end positioned in the upper portion of the nose pad. This opening in the nose guard permits air to circulate freely to the skin in the center portion of the nose guard. Thus, the skin of this section of the nose can "breathe" freely and perspiration is prevented, materially adding to the comfort of the wearer of this type of frame.

The upper rear portion 25 of nose guard 18 is preferably of substantially larger area than the other portions of the nose guard, and this portion is preferably adjusted so that it carries more weight than the other portions of the nose guard. This is desirable because this portion of the nose guard bears against a section of the nose adjacent the eye socket particularly suited for carrying weight. Thus, by increasing the size of the nose pad at this point, the greatest weight is carried by that portion of the nose best suited to do so, and this materially adds to the comfort of the wearer.

To prevent pinching of the skin by opening 22, this opening gradually increases in width as it extends upwardly through the nose guard. At the top, the opening has reached a substantial width, and this end is closed by a gradual curve extending thereacross. The lower inner edge of the upper portion of the nose guard preferably tapers downwardly and outwardly, as best seen in Figure 4. Both of these features coact to prevent this opening from having any pinching effect on any skin extending therein.

It will thus be seen that this nose guard effectively eliminates one of the major difficulties with nose guards of the type described—namely, preventing "breathing" of the skin beneath a nose guard. A further advantage lies in the fact that the construction of this nose guard permits a retailer to easily and quickly adjust it to any shape of nose. Furthermore, this nose pad is so constructed that it may be worn with a maximum of comfort. It will thus be seen that I have provided a thoroughly practical and durable nose guard construction in which the several objects hereinabove mentioned, as well as many others, are accomplished.

As many possible embodiments may be made of the above invention, and as many changes may be made in the embodiment above set forth, it is to be understood that all matter hereinabove set forth or shown in the accompanying drawing is to be interpreted as illustrative and not in a limiting sense.

I claim:

In eyeglass construction, in combination, a pair of plastic rims, a non-metallic bridge connecting said rims, the lower portions of the inner edges of said rims slanting downwardly and outwardly whereby they are adapted to fit the nose of a wearer, and a pair of plastic members secured to the rear surface of said frame and extending rearwardly therefrom, said members having their substantially flat inner surfaces positioned in the same planes as the inner edges of said rims, said members having a pair of openings therein of substantially a tear-drop shape which extend substantially throughout the lengths of said members, said openings having their large ends positioned adjacent the upper ends of said members, said members having sections in the upper rear portions thereof of substantially larger area than the other portions of said members so that the greatest weight of the frame is carried by that portion of the nose adjacent the eye socket, said members having their inner edges adjacent the upper ends of the openings therein outwardly beveled.

FRANK J. NERNEY.